United States Patent
Ng et al.

(10) Patent No.: US 11,412,673 B2
(45) Date of Patent: Aug. 16, 2022

(54) ARTICLE FOR ENRICHING SOIL FERTILITY

(71) Applicant: PS Global Sdn Bhd, Shah Alam (MY)

(72) Inventors: Kim Fui Ng, Shah Alam (MY); Lee Yien Thang, Kuantan (MY)

(73) Assignee: PS Global SDN. BHD., Selangor (MY)

( * ) Notice: Subject to any disclaimer, the term of this patent is extended or adjusted under 35 U.S.C. 154(b) by 116 days.

(21) Appl. No.: 16/729,552

(22) Filed: Dec. 30, 2019

(65) Prior Publication Data

US 2020/0205359 A1 Jul. 2, 2020

(30) Foreign Application Priority Data

Dec. 31, 2018 (SG) .......................... 10201811846V (51) Int. Cl.
*A01G 29/00* (2006.01)
*C05G 5/00* (2020.01)
*A01C 21/00* (2006.01)

(52) U.S. Cl.
CPC .............. *A01G 29/00* (2013.01); *A01C 21/00* (2013.01); *A01C 21/002* (2013.01); *C05G 5/45* (2020.02)

(58) Field of Classification Search
None
See application file for complete search history.

(56) References Cited

U.S. PATENT DOCUMENTS

| | | | | |
|---|---|---|---|---|
| 3,468,796 A | * | 9/1969 | Noll | C02F 1/686 210/641 |
| 4,557,749 A | * | 12/1985 | Berthet | C05G 3/44 71/64.11 |
| 5,403,740 A | * | 4/1995 | Menefee | C05F 17/907 435/290.1 |
| 5,641,127 A | * | 6/1997 | Masumura | C05F 17/15 241/17 |
| 6,401,390 B1 | * | 6/2002 | Labbe | B32B 29/06 47/48.5 |
| 7,342,058 B2 | * | 3/2008 | Peppmoller | C05G 3/80 524/13 |

* cited by examiner

*Primary Examiner* — Wayne A Langel
(74) *Attorney, Agent, or Firm* — Ballard Spahr LLP (57) ABSTRACT

The present disclosure relates to an article for enriching soil fertility, a method of manufacturing the same and a method of enriching soil fertility. The article comprising: a plurality of containers, each having a respective fluid-permeable membrane and each containing one or more fertilizers. At least one of permeabilities of the membranes and contents of the one or more fertilizers are selected to control a release of the fertilizers from the containers.

18 Claims, 8 Drawing Sheets

ARTICLE FOR ENRICHING SOIL FERTILITY

CROSS REFERENCE TO RELATED APPLICATIONS

This is a U.S. non-provisional patent application that claims priority to Singapore patent application No. 10201811846V, filed on Dec. 31, 2018, which is incorporated herein by reference in its entirety.

FIELD OF INVENTION

The present invention relates broadly, but not exclusively, to an article for enriching soil fertility, a method of manufacturing the same and a method of enriching soil fertility.

BACKGROUND

Excessive farming activities are causing land degradation problems to become increasingly severe. If a piece of land is deprived of the necessary nutrients for a sustained period of time, the land may be plagued by serious issues such as soil compaction, poor internal drainage, salinalisation and increased soil acidity.

Typically, fertilizers are used in manuring and treatment processes to restore the land back to its productive state. However, an uncontrolled usage of fertilizers may cause ineffective and inconsistent supply of nutrients to the plants. For example, different types of nutrients may be needed at each stage of plant growth and it could be difficult to implement a timely supply of fertilizers to the plants. This may in turn result in wastage of fertilizers and environmental contamination.

Further, the manuring and treatment processes can also be cumbersome as the fertilizers may be incompatible to be used together. For example, microbes can be incompatible with some fertilizers and combining the substances may kill the microbes as the salt potency of the fertilizers would remove the moisture from the microbes. Consequently, there are limitations in the method of supplying the fertilizers to the plants.

A need therefore exists to provide an article for enriching soil fertility and a method of manufacturing the same that seek to address at least one of the problems above or to provide a useful alternative.

SUMMARY

According to a first aspect of the present invention, there is provided an article for enriching soil fertility, the article comprising a plurality of containers comprising an outer container and an inner container disposed within the outer container, each container having a respective fluid-permeable membrane and each containing one or more fertilizers, wherein at least one of permeabilities of the membranes and contents of the one or more fertilizers are selected to control a release of the fertilizers from the containers.

The fluid-permeable membrane may comprise at least one selected from a group consisting of kraft paper, recycled paper, sack kraft, polylactic acid derived polymers, polyhydroxyalkanoate derived polymers, polyethylene-derived polymers, polyurethane-derived polymers, polymer laminated onto paper and polymer laminated on polymer.

The fluid-permeable membrane may be made of one or more degradable materials selected from a group consisting of a biodegradable material, oxo-degradable and photodegradable materials.

The fluid-permeable membrane may comprise a perforated membrane.

The one or more fertilizers may be selected from a group consisting of a bio-fertilizer, a mineral fertilizer, an organic fertilizer, an inorganic fertilizer and a chemical fertilizer.

The bio-fertilizer may be disposed in a separate container from the inorganic fertilizer.

At least one of the plurality of containers may further comprise a moisture regulator configured to repeatedly absorb moisture from outside said container and release the absorbed moisture into a space within said container based on a moisture gradient existing between the space within said container and outside said container, to control a release of the fertilizer from said container through the membrane.

The moisture regulator may comprise a plurality of hydrogels.

According to a second aspect of the present invention, there is provided a method of enriching soil fertility, the method comprising the step of placing the article as defined in the first aspect adjacent to a root of a plant.

According to a third aspect of the present invention, there is provided an article for enriching soil fertility, the article comprising:

a plurality of containers, each having a respective fluid-permeable membrane and each containing one or more fertilizers, wherein the plurality of containers is disposed within a fluid-permeable housing; and wherein at least one of permeabilities of the membranes and contents of the one or more fertilizers are selected to control a release of the fertilizers from the containers.

According to a fourth aspect of the present invention, there is provided a method of enriching soil fertility, the method comprising the step of placing the article as defined in the third aspect adjacent to a root of a plant.

BRIEF DESCRIPTION OF THE DRAWINGS

Embodiments of the invention are provided by way of example only, and will be better understood and readily apparent to one of ordinary skill in the art from the following written description and the drawings, in which.

DETAILED DESCRIPTION

Figure 1:
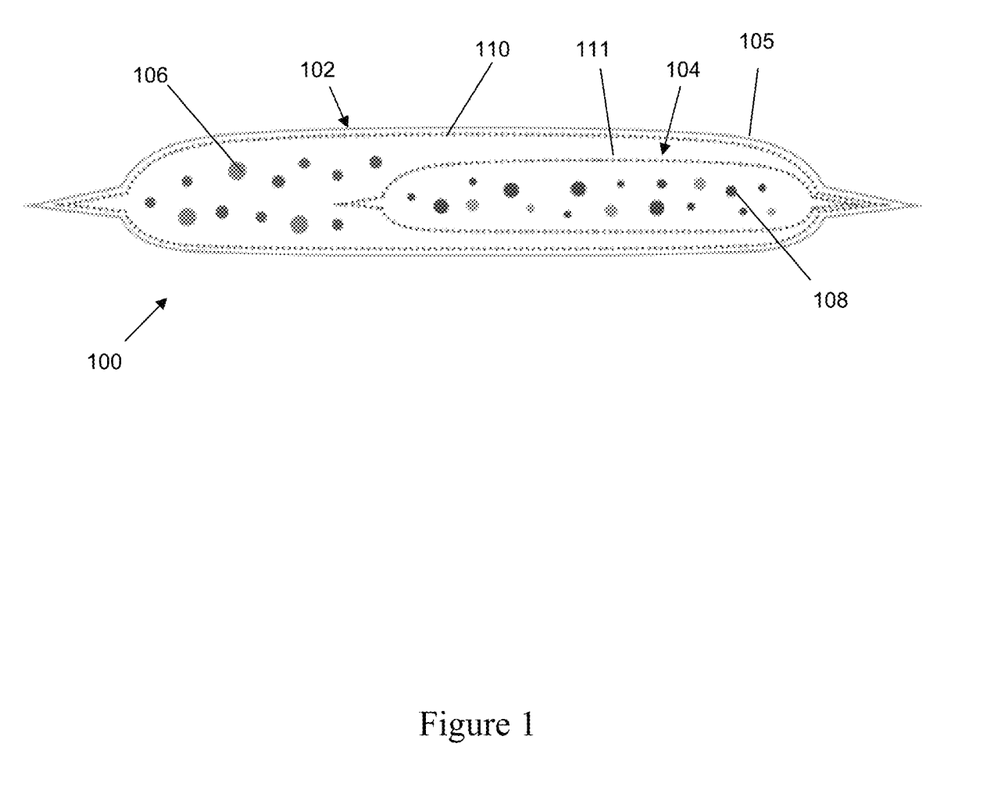
FIG. 1 illustrates a schematic diagram of an article for enriching soil fertility in accordance with an example embodiment.

FIG. 1 illustrates a schematic diagram of an article 100 for enriching soil fertility in accordance with an example embodiment. The article 100 includes an outer container 102 and an inner container 104 disposed in the outer container 102. The article 100 also optionally includes an external housing 105 which provides protection and prevents leakage. A first fertilizer 106 is disposed in the outer container 102 and a second fertilizer 108 is disposed in the inner container 104. These fertilizers 106, 108 are configured to dissolve upon contacting moisture.

The outer container 102 and inner container 104 are made of respective fluid-permeable membranes 110, 111, which are configured to allow transfer of fluid and the fertilizers 106, 108 through the membranes 110, 111. The outer and inner containers 102, 104 have a plurality of permeabilities associated with the release of the fertilizers 106, 108 to the soil outside the article 100 through the membranes 110, 111. At least one of permeabilities of the membranes 110, 111 and contents of the fertilizers 106, 108 are selected to control a release of the fertilizers from the containers 102, 104.

The article 100 may advantageously allow timely supply of the first fertilizer 106 and the second fertilizer 108 to the soil for optimal plant growth. The outer container 102 would release the first fertilizer 106 to the soil, and the inner container 104 would release the second fertilizer 108 to the soil at a later time. In other words, the release of the second fertilizer 108 to the soil occurs at a period of time after the release of the contents from the outside container 102.

The fluid-permeable membranes 110, 111 form porous, flexible and sealed containers 102, 104. The membranes 110, 111 may include at least one selected from a group consisting of kraft paper, recycled paper, sack kraft, polylactic acid derived polymers, polyhydroxyalkanoate derived polymers, polyethylene-derived polymers, polyurethane-derived polymers, polymer laminated onto paper and polymer laminated on polymer. In an embodiment, the membranes 110, 111 can be a perforated membrane and the adjustment of the size of the perforations may allow the release rate of the fertilizers to be controlled accurately. The size of the perforations is typically in the range of 0.1-5.0 mm in diameter.

The fertilizer includes at least one type of fertilizer selected from a group consisting of a bio-fertilizer, a mineral fertilizer, an organic fertilizer, an inorganic fertilizer and a chemical fertilizer. The bio-fertilizer includes microbes that support plant growth. The microbes are typically selected from the plant-associated microbial community, plant growth promoting microbes (PGPM) and root-associated microbial community. Examples of microbes include rhizobia, azotobacters, azospirillum, phosphate solubilizing bacteria (PSB), vesicular arbuscular mycorrhiza (VAM) and plant growth-promoting rhizobacteria (PGPR) selected from the genera of *Pseudomonas, Enterobacter, Bacillus, Variovorax, Klebsiella, Burkholderia, Azospirillum, Serratia, Azotobacter*.

Examples of mineral fertilizers 114 include urea, ammonium chloride, ammonium sulfate, ammonium nitrate, monoammonium phosphate, diammonium phosphate, potassium chloride, potassium phosphate, borate pentahydrate, copper (II) sulphate, magnesium sulphate, ferrous sulphate, zinc sulphate, manganese sulphate, sodium molybdate, etc.

Examples of organic fertilizers 116 include compost, rock phosphate, etc.

The fertilizer may further include at least one selected from a plant enzyme and a plant bio-stimulant to encourage development of the plants.

In an embodiment, one or both containers 102, 104 further include a moisture regulator configured to repeatedly absorb moisture from outside the containers 102, 104 and release the absorbed moisture into a space within the containers 102, 104 based on a moisture gradient existing between the space within the containers 102, 104 and outside the containers 102, 104, to control a release of the fertilizers 106, 108 from the containers 102, 104 through the membranes 110, 111. In an embodiment, the moisture regulator includes hydrogels, such as homopolymeric hydrogels, copolymeric hydrogels and multipolymer interpenetrating polymeric hydrogels.

The moisture is retained in the hydrogels until the moisture concentration at the surrounding environment drops below the moisture concentration inside the article 100. The moisture released from the hydrogels dissolves the fertilizers 106, 108 for absorption by the plants.

In use, the article 100 is placed adjacent to a root of a plant, such as on the soil, or partially or completely buried in the soil. In an embodiment, the membranes 110, 111 and the moisture regulator are made of degradable materials, such as a biodegradable, oxo-degradable or photodegradable material. Thus, the article 100 will decompose in the environment after a period of time. This is advantageous to the environment as the use of the article 100 would not cause any pollution. Also, this can result in significant economic and time savings since it is not necessary to dispose the article 100 after use.

Figure 2A:
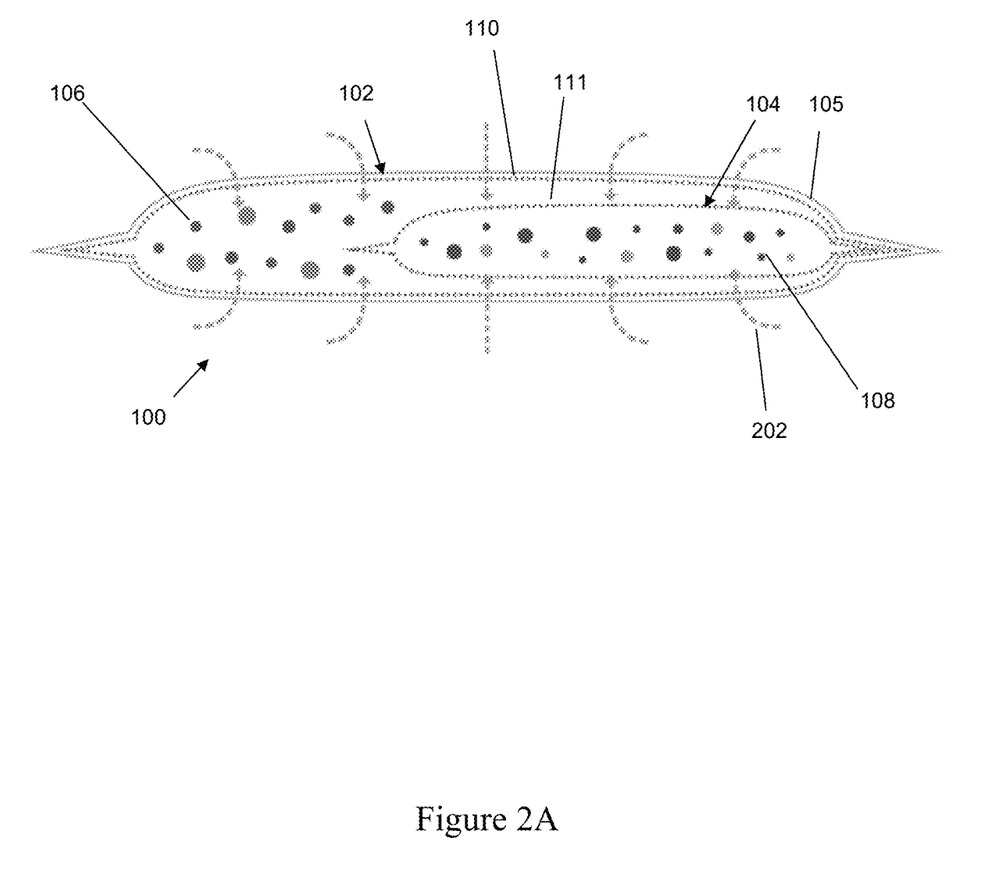
FIG. 2A illustrates the process of moisture absorption of the article of FIG. 1.

FIG. 2A illustrates the process of moisture absorption of the article 100 of FIG. 1. Here, the external housing 105 decomposes to allow the moisture from the surrounding environment to be transferred into the article 100. As shown with arrows 202 in FIG. 2A, moisture penetrates via the permeable membranes 110, 111 into the outer container 102 and subsequently to the inner container 104 following a concentration gradient of the moisture molecules across the permeable membranes 110, 111.

Figure 2B:
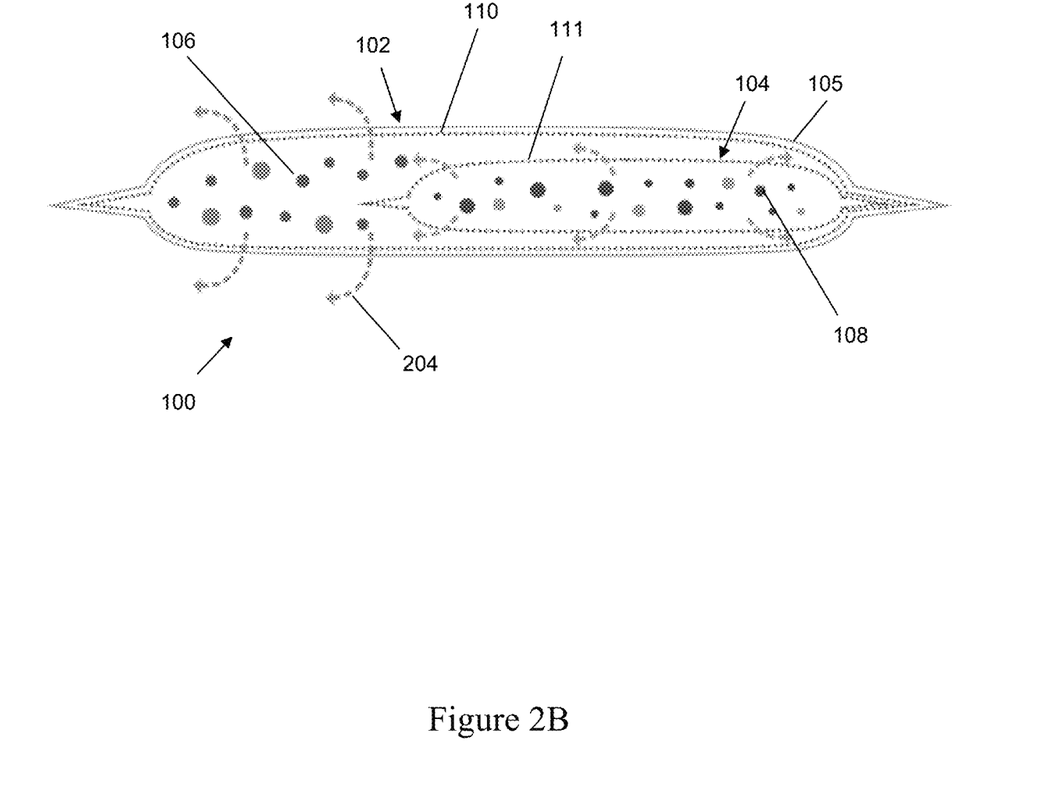
FIG. 2B illustrates an initial stage of the process of a release of fertilizers from the article, following the moisture absorption process shown in FIG. 2A.

FIG. 2B illustrates an initial stage of the process of a release of the fertilizers 106, 108 from the article 100, following the moisture absorption process shown in FIG. 2A. Here, the moisture absorbed through the permeable membranes 110, 111 dissolves the first fertilizer 106 and second fertilizer 108. As shown with arrows 204, the contents from the fertilizers 106, 108 are released according to a concentration gradient of the molecules across the respective permeable membranes 110, 111. The first fertilizer 106 is released to the soil outside the article 100, and the second fertilizer 108 is released to the outer container 102 and to the soil subsequently. The structure of the outer container 102 and inner container 104 provides a delayed release to the second fertilizer 108 disposed in the inner container 104, as compared to the first fertilizer 106 disposed in the outer container 102.

Figure 2C:
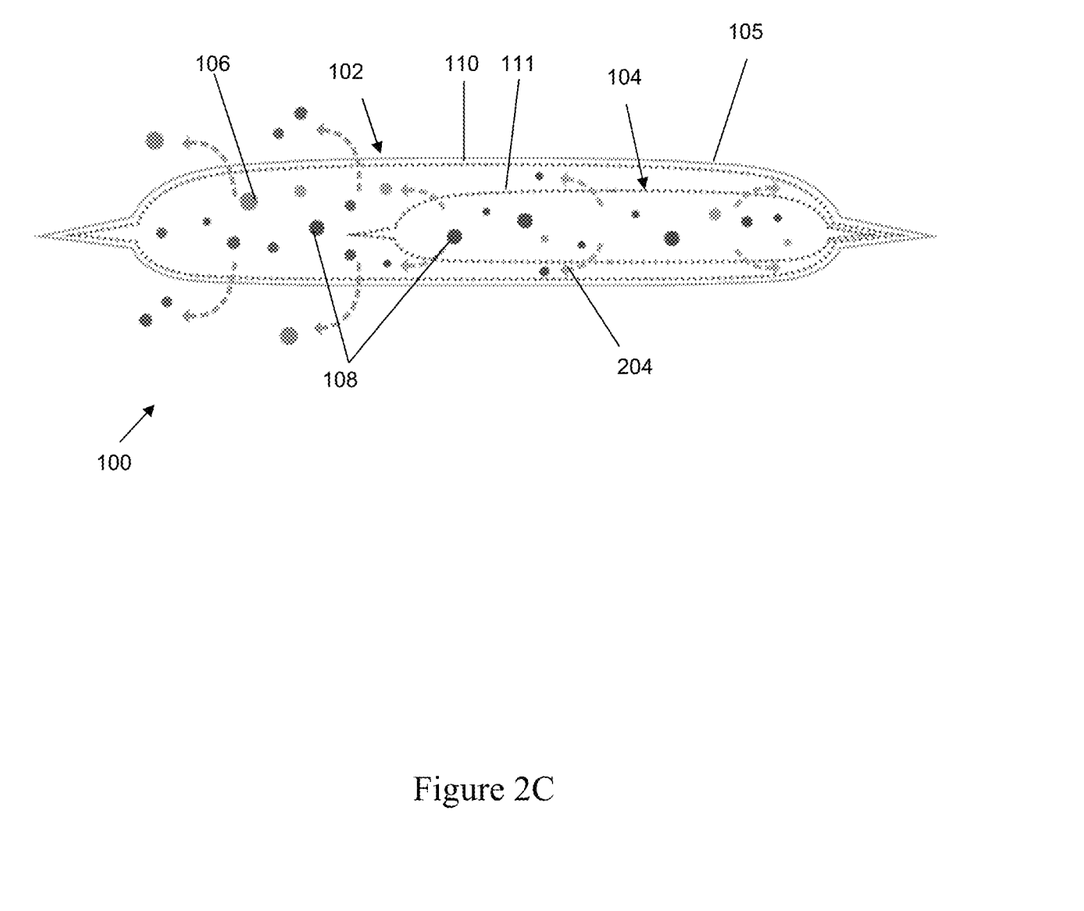
FIG. 2C illustrates a subsequent stage of the process of a release of fertilizers from the article, following the process shown in FIG. 2B.

FIG. 2C illustrates a subsequent stage of the process of a release of fertilizers 106, 108 from the article 100, following the process shown in FIG. 2B. Here, the first fertilizer 106 from the outer container 102 continues to be released across the permeable membrane 110 to the soil outside the article 100. The second fertilizer 108 from the inner container 104 is released into outer container 102 to replenish the first fertilizer 106 in the outer container 102. The second fertilizer 108 from the inner container 104 mix with the first fertilizer 106 in outer container 102 to form a balanced formulation for plant uptake.

Working Example (Phosphate Release with Sequential-Controlled Mechanism)

Phosphate is required for root growth and prone to mineralization and immobilization. In this example, a first formulation including a phosphate fertilizer is incorporated in the outer container 102, and a second formulation including the standard elements of nitrogen (N), phosphorous (P), potassium (K), magnesium (Mg), boron (B), copper (Cu), zinc (Zn) is disposed in the inner container 104. The outer container 102 and inner container 104 are made of respective fluid-permeable membranes 110, 111, with the outer membrane 110 having greater permeability than the inner membrane 111. Phosphate of the phosphate fertilizer in the outer container 102 will be released almost immediately upon contact with the soil and moisture. This provides sufficient phosphate supply to the plant during a lag period of the release of the contents from the inner container 104. The second formulation, including phosphate, in the inner container 104 is released gradually after the lag period and the phosphate from the inner container 104 could replenish the phosphate lost in the outer container 102.

Figure 3:
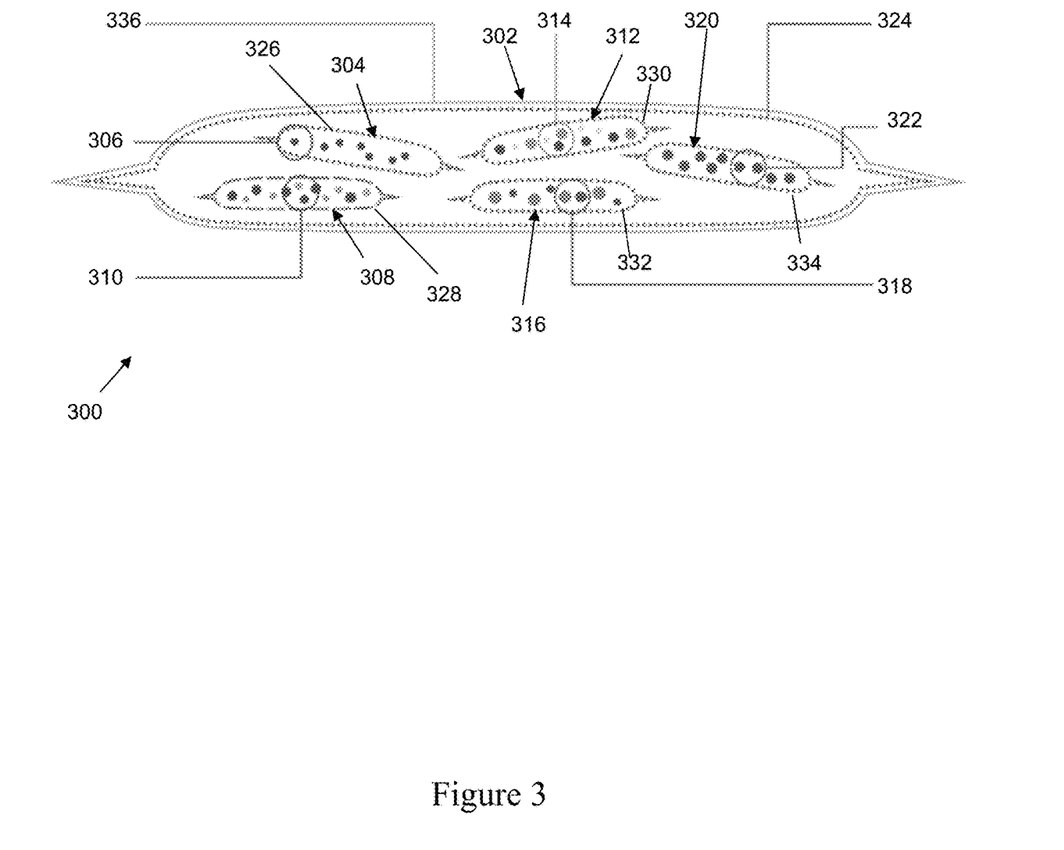
FIG. 3 illustrates a schematic diagram of an article for enriching soil fertility in accordance with a further example embodiment.

FIG. 3 illustrates a schematic diagram of an article 300 for enriching soil fertility in accordance with a further example embodiment. In this example, the article 300 includes a fluid-permeable housing 302 and five containers disposed in the fluid-permeable housing 302.

The first container 304 contains hydrogels 306 that regulate the moisture content in the article 300. The second container 308 contains an inorganic fertilizer 310. In an embodiment, the second container 308 has a perforated membrane which is used for controlling the release rate of the fertilizers through its perforations more accurately. The third container 312 contains plant bio-stimulants 314 such as amino acids, polysaccharides, peptides, phytohormones, etc. The fourth container 316 contains a beneficial bio-fertilizer 318 including microbes and microbes incubator. The fifth container 320 contains organic fertilizers 322, such as humic acids, fulvic acids, plant extracts, etc.

The bio-fertilizer 318 is disposed in the fourth container 316 that has a higher release rate than the other containers to prevent a simultaneous release of the microbes of the bio-fertilizer and the contents of other containers. This may ensure that the living microbes can survive and populate the soil outside the article 300 before the release of the fertilizers disposed in other containers.

The fluid-permeable housing 302 and five containers are made of respective fluid-permeable membranes 324, 326, 328, 330, 332, 334 configured to allow transfer of fluid and the contents through the membranes 324, 326, 328, 330, 332, 334. For example, the permeability of the membranes 324, 326, 328, 330, 332, 334 may be controlled by adjusting the density of the membranes 324, 326, 328, 330, 332, 334. The fluid-permeable housing 302 also optionally includes an external housing 336 which provides protection and prevents leakage.

It will be appreciated that the containers can include multiple types of fertilizers. For example, an organic fertilizer such as humic acid can be housed in a single container with a plant bio-stimulant such as seaweed extract, as these two substances are compatible and can enhance the nutrient intake of the plant root.

Figure 4A:
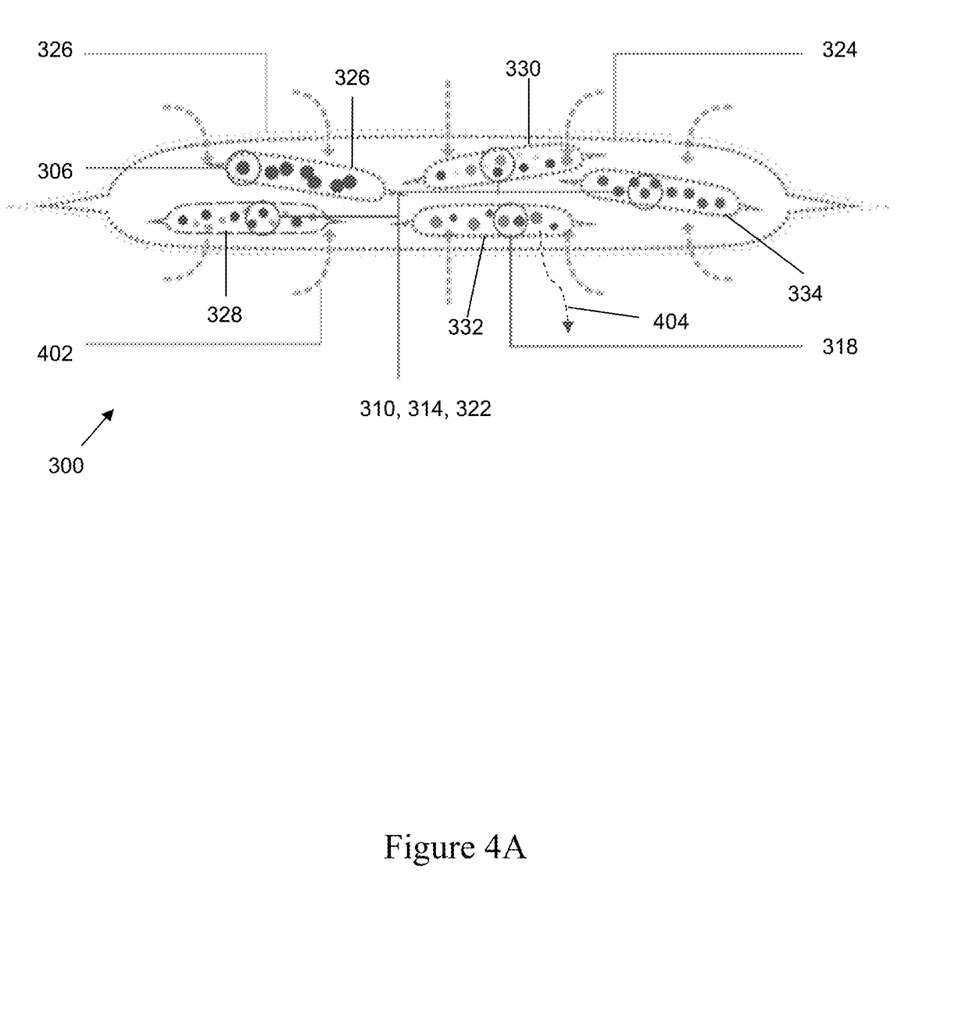
FIG. 4A illustrates the process of moisture absorption of the article of FIG. 3.

FIG. 4A illustrates the process of moisture absorption of the article 300 of FIG. 3. Here, the external housing 336 decomposes to allow the moisture from the surrounding environment to be transferred into the article 300, as shown with arrows 402. The microbes 318 are activated by the moisture and released into the surrounding soil to enrich the soil, as shown with the arrow 404. The inorganic fertilizer 310, plant bio-stimulants 314 and organic fertilizers 322 are subsequently dissolved upon contacting the moisture. The contents from the inorganic fertilizer 310, plant bio-stimulants 314 and organic fertilizers 322 are released into the soil after the release of microbes, to avoid jeopardizing the microbial activity. At this period of time, the hydrogels 306 are absorbing and retaining the moisture.

Figure 4B:
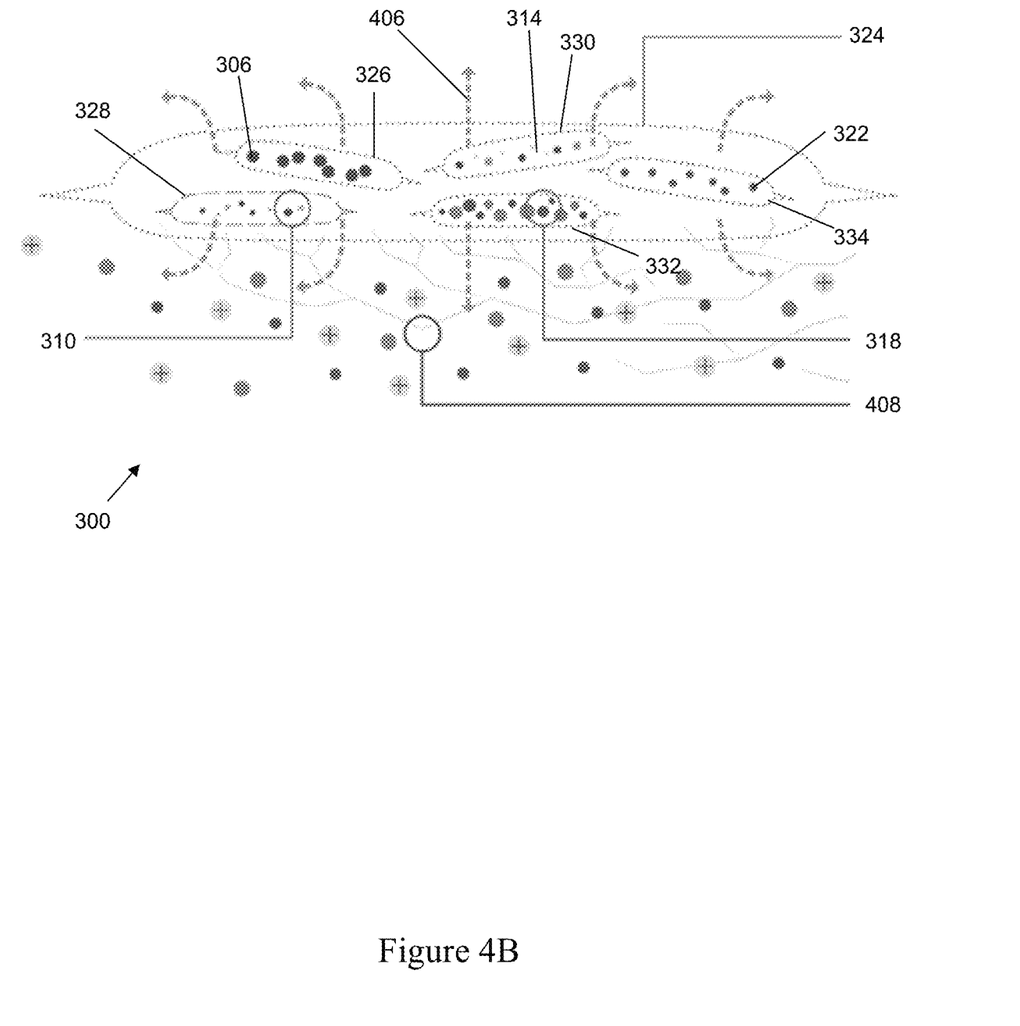
FIG. 4B illustrates the process of a release of fertilizers from the article, following the moisture absorption process shown in FIG. 4A.

FIG. 4B illustrates the process of a release of contents from the article 300, following the moisture absorption process shown in FIG. 4A. The release of microbes 318 is completed, and the dissolved inorganic fertilizer 310, plant bio-stimulants 314 and organic fertilizers 322 are released gradually in accordance with the respective release rates, as shown with arrows 406. The moisture is retained in the hydrogels 306 until the moisture concentration at the surrounding environment drops below the moisture concentration inside the article 300. The moisture released from the hydrogel 108 dissolves the fertilizers for use by the plants.

The fertility of the soil surrounding the article 300 attracts nearby plants to extend out the roots 408 towards the article 300. Constant nutrients, along with beneficial microbial activities, may advantageously increase the root density surrounding the article 300. The permeable membranes 324, 326, 328, 330, 332, 334 will decompose over time in the environment as a result of microbial activity.

Figure 5:
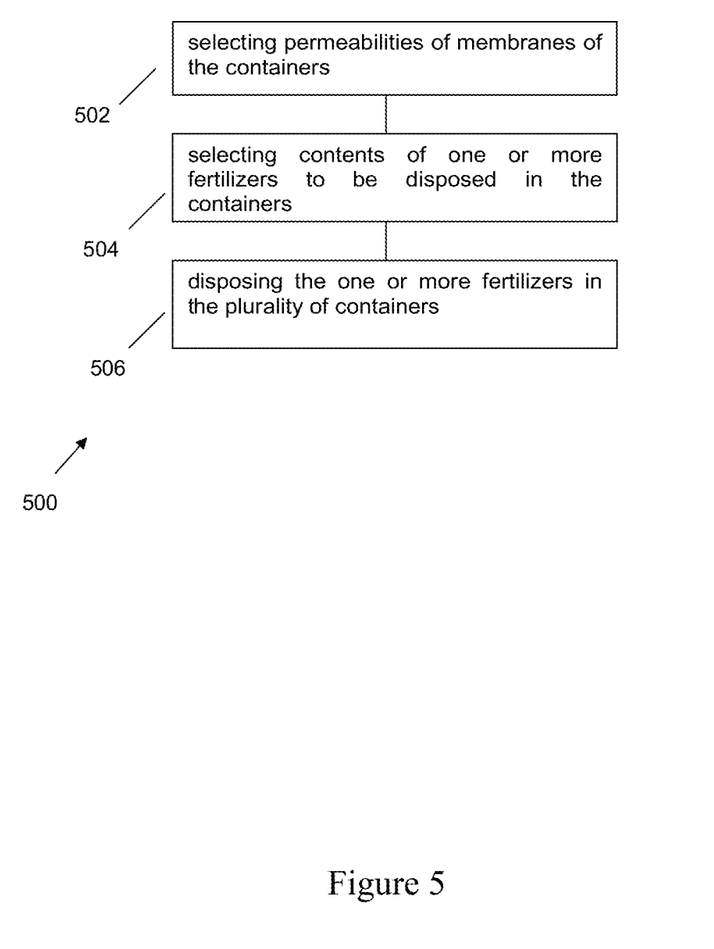
FIG. 5 shows a flow chart illustrating a method of manufacturing an article for enriching soil fertility in accordance with an example embodiment.

FIG. 5 shows a flow chart 500 illustrating a method of manufacturing an article for enriching soil fertility in accordance with an example embodiment. The article comprises a plurality of containers. At step 502, permeabilities of membranes of the containers are selected. At step 504, contents of one or more fertilizers to be disposed in the containers are selected. At step 506, the one or more fertilizers are disposed in the plurality of containers.

Embodiments of the present invention provide an article 100, 300 for enriching soil fertility and a method of manufacturing the same. The article can contain more than multiple formulations that allow the plant to survive and be well-nourished. The article 100, 300 includes customized containers that allow sequential-controlled release of nutrients, whereby the release rate of the fertilizers from the containers can be controlled. This allows prioritization of the release of fertilizers in the article 100, 300 and provides consistent supply of nutrients based on the nutrients requirements of the plants. Also, the structures of the article 100, 300 that include separate containers may allow the bio-fertilizer to be packed with other fertilizers in a single article, without jeopardizing the microbial activity and functionality of the fertilizers. As a result, plants treated with the article 100, 300 showed a deeper and more extensive root system, including larger root diameter, and more tertiary and quarternary roots.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An article for enriching soil fertility, the article comprising:
a plurality of containers comprising an outer container and an inner container disposed within the outer container, each container of the plurality of containers having a respective fluid-permeable membrane and containing one or more fertilizers,
wherein at least one of permeabilities of the membranes and contents of the one or more fertilizers are selected to control a release of the fertilizers from the containers.

2. The article as claimed in claim 1, wherein the one or more fertilizers are selected from a group consisting of a bio-fertilizer, a mineral fertilizer, an organic fertilizer, an inorganic fertilizer and a chemical fertilizer.

3. The article as claimed in claim 2, wherein at least one of the plurality of containers further comprises a moisture regulator configured to repeatedly absorb moisture from outside said container and release the absorbed moisture into a space within said container based on a moisture gradient existing between the space within said container and outside said container, to control a release of the fertilizer from said container through the membrane.

4. The article as claimed in claim 3, wherein the moisture regulator comprises a plurality of hydrogels.

5. The article as claimed in claim 2, wherein the bio-fertilizer is disposed in a separate container from the inorganic fertilizer.

6. The article as claimed in claim 1, wherein the fluid-permeable membrane comprises at least one selected from a group consisting of kraft paper, recycled paper, sack kraft, polylactic acid derived polymers, polyhydroxyalkanoate derived polymers, polyethylene-derived polymers, polyurethane-derived polymers, polymer laminated onto paper and polymer laminated on polymer.

7. The article as claimed in claim 1, wherein the fluid-permeable membrane is made of one or more degradable materials selected from a group consisting of a biodegradable, oxo-degradable and photodegradable materials.

8. The article as claimed in claim 1, wherein the fluid-permeable membrane comprises a perforated membrane.

9. A method of enriching soil fertility, the method comprising the step of placing the article as claimed in claim 1 adjacent to a root of a plant.

10. An article for enriching soil fertility, the article comprising:
a plurality of containers, each having a respective fluid-permeable membrane and each containing one or more fertilizers,
wherein the plurality of containers is disposed within a fluid-permeable housing; and
wherein at least one of permeabilities of the membranes and contents of the one or more fertilizers are selected to control a release of the fertilizers from the containers.

11. The article as claimed in claim 10, wherein the one or more fertilizers are selected from a group consisting of a bio-fertilizer, a mineral fertilizer, an organic fertilizer, an inorganic fertilizer and a chemical fertilizer.

12. The article as claimed in claim 11, wherein at least one of the plurality of containers further comprises a moisture regulator configured to repeatedly absorb moisture from outside said container and release the absorbed moisture into a space within said container based on a moisture gradient existing between the space within said container and outside said container, to control a release of the fertilizer from said container through the membrane.

13. The article as claimed in claim 12, wherein the moisture regulator comprises a plurality of hydrogels.

14. The article as claimed in claim 11, wherein the bio-fertilizer is disposed in a separate container from the inorganic fertilizer.

15. The article as claimed in claim 10, wherein the fluid-permeable membrane comprises at least one selected from a group consisting of kraft paper, recycled paper, sack kraft, polylactic acid derived polymers, polyhydroxyalkanoate derived polymers, polyethylene-derived polymers, polyurethane-derived polymers, polymer laminated onto paper and polymer laminated on polymer.

16. The article as claimed in claim 10, wherein the fluid-permeable membrane is made of one or more degradable materials selected from a group consisting of a biodegradable, oxo-degradable and photodegradable materials.

17. The article as claimed in claim 10, wherein the fluid-permeable membrane comprises a perforated membrane.

18. A method of enriching soil fertility, the method comprising the step of placing the article as claimed in claim 10 adjacent to a root of a plant.

* * * * *